United States Patent
Henry et al.

(10) Patent No.: US 6,230,261 B1
(45) Date of Patent: May 8, 2001

(54) METHOD AND APPARATUS FOR PREDICTING CONDITIONAL BRANCH INSTRUCTION OUTCOME BASED ON BRANCH CONDITION TEST TYPE

(75) Inventors: G. Glenn Henry; Terry Parks, both of Austin, TX (US)

(73) Assignee: I. P. First, L.L.C., Fremont, CA (US)

( * ) Notice: Subject to any disclaimer, the term of this patent is extended or adjusted under 35 U.S.C. 154(b) by 0 days.

(21) Appl. No.: 09/203,900

(22) Filed: Dec. 2, 1998

(51) Int. Cl.[7] .............................. G06F 9/32; G06F 15/76; G06F 9/45
(52) U.S. Cl. .............................. 712/240; 712/239; 712/1; 717/4
(58) Field of Search .................................. 712/239, 233, 712/240, 1; 717/4

(56) References Cited

U.S. PATENT DOCUMENTS

| | | | |
|---|---|---|---|
| 5,659,752 | * 8/1997 | Heisch et al. | 717/4 |
| 5,828,874 | * 10/1998 | Steely, Jr. et al. | 712/240 |
| 5,848,268 | * 12/1998 | Matsuo | 712/233 |
| 5,978,909 | * 11/1999 | Lempel | 712/239 |
| 6,088,793 | * 7/2000 | Liu et al. | 712/239 |

OTHER PUBLICATIONS

Using hybrid predictors to improve branch prediction accuracy in the presence of context switches, Evers et al, ISCA 5/96.
Superscalar microprocessor design, Mike Johnson, Prentice Hall 1991.
A System Level Perspective on Branch Architecture Performance, Calder et al 1995 IEEE.
Alternative Implementations of Hybrid Branch Predictors, Chang et al, 1995 IEEE.
The BI–Mode Branch Predictor, Lee et al, 1997 IEEE.
Assigning Confidence to Conditional Predictiiions, Jacobsen et al, 1996 IEEE.
Gshare, 'Agrees' Aid Branch Prediction, Linley Gwennap, Nov. 17, 1997, Microprocessor Report.
Combining Branch Predictors,Scott McFarling, Jun. 1993, WRL–Technical Note TN–36.
The Agree Predictor; A Mechanism for Reducing Negative Branch History Interference, Eric Sprangle et al.

\* cited by examiner

Primary Examiner—Daniel H. Pan
Assistant Examiner—Te Yu Chen
(74) Attorney, Agent, or Firm—E. Alan Davis; James W. Huffman (57) ABSTRACT

An apparatus and method for improving the execution of conditional branch instructions is provided. A static branch predictor makes predictions about the outcomes of branch instructions based upon a combination of the test type (such as jump on overflow, jump if negative, jump if zero, jump on carry, etc.) and the sign of the displacement of the branch instruction. If the test type of the branch instruction is one of a subset of test types from which the branch outcome can accurately be predicted solely from the test type, then the predictor makes such a prediction. Otherwise, the predictor makes a prediction based upon the sign of the displacement used to calculate the branch target address. In this case, backward jumps are predicted taken and forward jumps are predicted not taken.

23 Claims, 6 Drawing Sheets

| Cycle | Fetch | Translate | Register | Address | Data/ALU | Write Back |
|---|---|---|---|---|---|---|
| 1 | $I_1$ | | | | | |
| 2 | $I_2$ | $I_1$ | | | | |
| 3 | $I_3$ | $I_2$ | $i_1$ | | | |
| 4 | $I_4$ | $I_3$ | $i_2$-JCC | $i_1$ | | |
| 5 | $I_5$ | $I_4$ | $i_3$ | $i_2$-JCC | $i_1$ | |
| 6 | $I_6$ | $I_5$ | $i_4$ | $i_3$ | $i_2$-JCC | $i_1$ |
| 7 | $I_{16}$ | *** | *** | *** | *** | $i_2$-JCC |
| 8 | $I_{17}$ | $I_{16}$ | *** | *** | *** | *** |
| 9 | *** | $I_{17}$ | $i_{16}$ | *** | *** | *** |
| 10 | *** | *** | $i_{17}$ | $i_{16}$ | *** | *** |
| 11 | *** | *** | *** | $i_{17}$ | $i_{16}$ | *** |
| 12 | *** | *** | *** | *** | $i_{17}$ | $i_{16}$ |

Fig. 4 (Related art)

| Instruction | Target Address Calculation |
|---|---|
| JCC | IP+Length+Displacement |
| JMP | Displacement, Register, Memory |
| CALL | Displacement, Register, Memory |
| RTN | Call-Return Stack |

| Instruction Test Type | Percentage Taken | Prediction Accuracy From Test Type |
|---|---|---|
| JO | 00.00 % | 100.00 % |
| JNO | 100.00 % | 100.00 % |
| JC | 45.08 % | 54.92 % |
| JNC | 31.94 % | 68.06 % |
| JZ | 35.60 % | 64.40 % |
| JNZ | 47.99 % | 52.01 % |
| J(C\|Z) | 62.58 % | 62.58 % |
| JN(C\|Z) | 31.58 % | 68.42 % |
| JS | 30.90 % | 69.10 % |
| JNS | 86.15 % | 86.15 % |
| JP | 00.00 % | 100.00 % |
| JNP | 00.00 % | 100.00 % |
| J(S^O) | 33.91 % | 66.09 % |
| JN(S^0) | 59.34 % | 59.34 % |
| J(S^0)\|Z | 33.88 % | 66.12 % |
| JN(S^0)\|Z | 57.25 % | 57.25 % |
| JCXZ | 29.51 % | 70.49 % |

Fig. 7

|  | Negative displacement | Positive displacement |
|---|---|---|
| In TAKEN subset | Predict TAKEN | Predict TAKEN |
| In NOT TAKEN subset | Predict NOT TAKEN | Predict NOT TAKEN |
| In neither subset | Predict TAKEN | Predict NOT TAKEN |

METHOD AND APPARATUS FOR PREDICTING CONDITIONAL BRANCH INSTRUCTION OUTCOME BASED ON BRANCH CONDITION TEST TYPE

BACKGROUND OF THE INVENTION

1. Field of the Invention

This invention relates in general to the field of microprocessors, and more particularly to a method and apparatus for performing branch prediction based on branch instruction test type.

2. Description of the Related Art

Computer instructions are typically stored in successive addressable locations within a memory. When processed by a Central Processing Unit (CPU), the instructions are fetched from consecutive memory locations and executed. Each time an instruction is fetched from memory, a program counter within the CPU is incremented so that it contains the address of the next instruction in the sequence. This is the next sequential instruction pointer, or NSIP. Fetching of an instruction, incrementing of the program counter, and execution of the instruction continues linearly through memory until a program control instruction is encountered.

A program control instruction, when executed, changes the address in the program counter and causes the flow of control to be altered. In other words, program control instructions specify conditions for altering the contents of the program counter. The change in the value of the program counter as a result of the execution of a program control instruction causes a break in the sequence of instruction execution. This is an important feature in digital computers, as it provides control over the flow of program execution and a capability for branching to different portions of a program. Examples of program control instructions include Jump, Test and Jump conditionally, Call, and Return.

A Jump instruction causes the CPU to unconditionally change the contents of the program counter to a specific value, i.e., to the target address for the instruction where the program is to continue execution. A Test and Jump conditionally causes the CPU to test the contents of a status register, or possibly compare two values, and either continue sequential execution or jump to a new address, called the target address, based on the outcome of the test or comparison. A Call instruction causes the CPU to unconditionally jump to a new target address, but also saves the value of the program counter to allow the CPU to return to the program location it is leaving. A Return instruction causes the CPU to retrieve the value of the program counter that was saved by the last Call instruction, and return program flow back to the retrieved instruction address.

In early microprocessors, execution of program control instructions did not impose significant processing delays because such microprocessors were designed to execute only one instruction at a time. If the instruction being executed was a program control instruction, by the end of execution the microprocessor would know whether it should branch, and if it was supposed to branch, it would know the target address of the branch. Thus, whether the next instruction was sequential, or the result of a branch, it would be fetched and executed.

Modern microprocessors are not so simple. Rather, it is common for modern microprocessors to operate on several instructions at the same time, within different blocks or pipeline stages of the microprocessor. As instructions are fetched, they are introduced into one end of the pipeline. They proceed through pipeline stages within a microprocessor until they complete execution. In such pipelined microprocessors it is often not known whether a branch instruction will alter program flow until it reaches a late stage in the pipeline. But, by this time, the microprocessor has already fetched other instructions and is executing them in earlier stages of the pipeline. If a branch causes a change in program flow, all of the instructions in the pipeline that followed the branch must be thrown out. In addition, the instruction specified by the target address of the branch instruction must be fetched. Throwing out the intermediate instructions, and fetching the instruction at the target address creates processing delays in such microprocessors.

To alleviate this delay problem, many pipelined microprocessors use branch prediction mechanisms in an early stage of the pipeline that predict the outcome of branch instructions, and then fetch subsequent instructions according to the branch prediction. Branch prediction schemes are commonly classified as either static or dynamic branch prediction schemes. With a static branch predictor, the prediction remains the same for a given branch instruction throughout the entire execution of the program in which the branch instruction is contained. That is, if the static branch predictor predicts a given branch will be taken the first time the branch instruction is executed, the static branch predictor will predict the branch will be taken every time the branch instruction is executed throughout the execution of the program. Thus, the prediction made by a static branch predictor does not depend upon the dynamic behavior of the branch instruction.

In contrast, dynamic branch predictors keep a history of the outcome of branch instructions as a program executes and make predictions based upon the history. Thus, one time a given branch instruction executes the dynamic branch predictor may predict the branch will be taken. But the next time the branch instruction executes, the dynamic branch predictor may predict the branch will not be taken, particularly if the branch was not taken the previous time.

Static branch prediction is typically performed in one of two ways. The first type of static branch prediction is commonly referred to as software branch prediction. "Software branch-prediction predicts branches statically by annotating the program with prediction information (such as setting a bit in a branch instruction to indicate the outcome of the branch) and relies on the fact that the outcome of a branch usually favors one possible outcome over the other. The favored outcome is determined by measuring an instruction trace or by making a reasonable guess based on program context (for example, loop branches are likely to be taken more often than not)." *Superscalar Microprocessor Design,* Mike Johnson, 1991, Prentice-Hall, Inc., p. 63.

For example, many software branch prediction schemes rely on a profiling compiler. First the target program is compiled without branch prediction or with default branch prediction. It is then executed one or more times and statistics are gathered about the outcome history of the various branches in the program. Then the program is recompiled using the statistics gathered. During the recompile, the compiler sets a bit in the branch instructions to indicate what the outcome of the branch is most likely to be. When the re-compiled program executes, the microprocessor uses the bit to predict branch outcomes. This type of scheme may only be employed on microprocessors that include hardware for examining the bit set by the profiling compiler.

Another static branch prediction scheme that has been employed is referred to as the BTFNT (Backwards Taken, Forward Not Taken) static branch prediction scheme. See "A System Level Perspective on Branch Architecture Performance", by Brad Calder, Dirk Grunwald and Joel Emer, from Proceedings of MICRO-28, Nov. 29–Dec. 1, 1995 at Ann Arbor, Mich., pp. 202–203. BTNFT branch prediction is premised upon the observation that historically approximately 80–90% of backward jumps are taken. This observation recognizes the presence of loops that are common in many programs. In this scheme, the static branch predictor examines the branch instruction and determines whether the direction of the target address of the branch is backward or forward relative to the location of branch instruction itself. For example, if the branch instruction is at address 0x34710 and the target address of the branch instruction is 0x34704, then the BTFNT scheme predicts the branch will be taken. If the target address is 0x34718, then the BTFNT scheme predicts the branch will not be taken.

Some branch instructions employ a signed displacement that is added to the processor's instruction pointer and the instruction length to calculate the target address of the branch instruction. A BTFNT static branch predictor making a prediction for such an instruction could simply examine the sign of the displacement and predict the branch will be taken if the sign is negative and predict the branch will not be taken if the sign is positive.

However, these present branch prediction mechanisms overlook valuable information pertaining to the probability of a branch. In particular, they do not consider the type of test performed by conditional branch instructions such as whether an overflow condition occurred or carry was performed during an arithmetic operation. Another example of a test type is determining whether the parity of an operand is even or odd. Other test type examples include comparisons of operands such as whether an operand is equal to zero, whether the sign of an operand is positive or negative and whether one operand is greater than another or less than another. Also, combinations of these test types are employed. The test type may provide information about the probability of branches being taken independent of the sign of the target address.

Therefore, what is needed is an apparatus and method that takes into account not only the sign of the branch target address displacement, but also the test type of conditional branch instructions.

SUMMARY

To address the above-detailed deficiencies, it is an object of the present invention to provide a method and apparatus and microprocessor that performs branch prediction based on branch instruction test type.

Accordingly, in the attainment of the aforementioned object, it is a feature of the present invention to provide a static branch predictor for performing branch prediction in a microprocessor. The static branch predictor includes an input that receives a test type specifying a condition upon which the branch instruction will be taken and an output that generates a signal for predicting whether the branch instruction will be taken in response to the test type. The static branch predictor further includes logic coupled to the input and output that determines if the test type is in a predefined subset of the test types defined in the microprocessor's instruction set. The logic conveys to the output a value predicting that the branch instruction will not be taken if the test type is in the predefined subset.

An advantage of the present invention is that by examining the test type, the branch predictor more accurately predicts the outcome of some branch instructions than previous branch predictors that used only the displacement sign.

It is a further object of the present invention to provide a method and apparatus and microprocessor that performs branch prediction based on a combination of branch instruction test type and target address displacement sign.

Accordingly, in the attainment of the aforementioned object, it is a feature of the present invention to provide a static branch predictor for performing branch prediction in a microprocessor based on a combination of the sign of a target address displacement and test type. The branch predictor includes a first input for receiving a sign of a displacement for calculating a target address of a branch instruction and a second input for receiving a test type for specifying a condition upon which said branch instruction will be taken. The predictor further includes an output for transmitting a signal for predicting whether the branch instruction will be taken in response to the conditional branch instruction. The branch predictor further includes logic configured to receive the first and second inputs and to generate the output signal. The logic determines if the test type is in either one of first and second predefined subsets of a plurality of test types defined in the microprocessor's instruction set. The logic generates a value on the output signal to predict the branch instruction will be taken if the test type is in the first predefined subset. The logic generates a value on the output signal to predict the branch instruction will not be taken if the test type is in the second predefined subset. The logic generates a value on the output signal to predict whether the branch instruction will be taken based on the displacement if the test type is not in either of the first and second predefined subsets.

An advantage of the present invention is that by supplying the test type in addition to the displacement sign to the branch predictor, the branch predictor more accurately predicts the outcome of branch instructions than previous branch predictors using only the displacement sign.

In another aspect, it is a feature of the present invention to provide a microprocessor that performs branch prediction based on a combination of branch instruction test type and direction of the branch target address. The microprocessor includes instruction fetch logic that fetches a conditional branch instruction comprising a displacement for calculating a target address of the branch instruction and a test type for specifying a condition upon which the branch instruction will be taken. The microprocessor further includes a static branch predictor coupled to the instruction fetch logic. The static branch predictor receives the conditional branch instruction from the instruction fetch logic and generates an output signal for provision to the instruction fetch logic for predicting whether the branch instruction will be taken in response to the conditional branch instruction. The static branch predictor includes logic for determining if the test type is in either one of first and second predefined subsets of a plurality of test types defined in the microprocessor's instruction set. The logic generates a value on the output signal to predict the branch instruction will be taken if the test type is in the first predefined subset. The logic generates a value on the output signal to predict the branch instruction will not be taken if the test type is in the second predefined subset. The logic generates a value on the output signal to predict whether the branch instruction will be taken based on the displacement if the test type is not in either of the first and second predefined subsets. The instruction fetch logic selectively fetches a next instruction in response to the output signal.

In yet another aspect, it is a feature of the present invention to provide a method for performing branch prediction within a microprocessor based on a combination of branch instruction test type and direction of the branch target address. The method includes the step of decoding a conditional branch instruction comprising a displacement for calculating a target address of the branch instruction and a test type for specifying a condition upon which the branch instruction will be taken. The method further determines if the test type is in either one of first and second predefined subsets of a plurality of test types defined in the microprocessor's instruction set. The method predicts the branch instruction will be taken if the test type is in the first predefined subset and the branch instruction will not be taken if the test type is in the second predefined subset. The method predicts whether the branch instruction will be taken based on the displacement if the test type is not in either of the first and second predefined subsets.

BRIEF DESCRIPTION OF THE DRAWINGS

These and other objects, features, and advantages of the present invention will become better understood with regard to the following description, and accompanying drawings where.

DETAILED DESCRIPTION

With the above Background of conditional branching in pipeline microprocessors, a specific example illustrating the detrimental performance impacts of branch misprediction within a related art pipelined microprocessor will now be described, with reference to FIGS. 1–3. After the problem has been described, a detailed description of the present invention that solves this problem will be provided.

Figure 1:
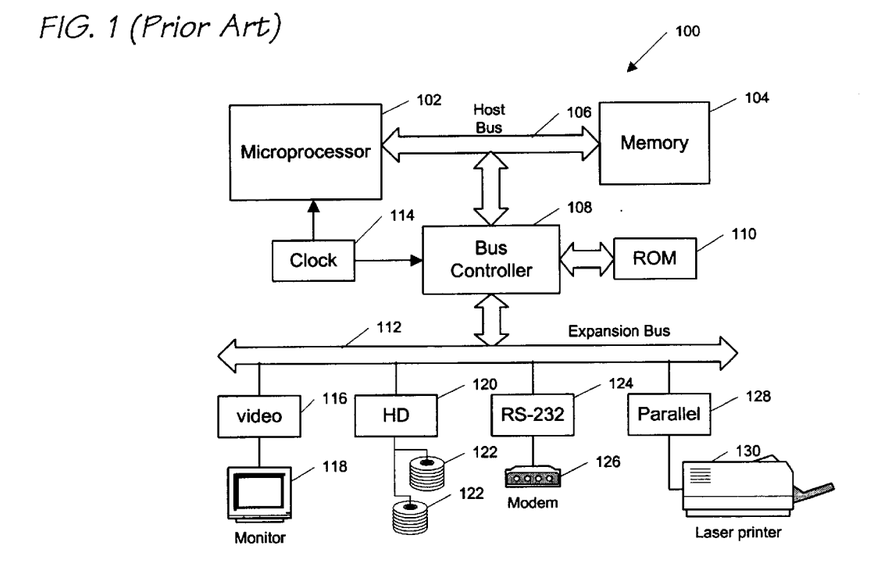
FIG. 1 is a prior art block diagram of a computer system that can incorporate a processor according to the present invention.

Referring to FIG. 1, a block diagram of a typical computer system 100 is shown. The computer system 100 includes a microprocessor 102 connected to a memory 104 via a host bus 106. Also connected to the microprocessor 102 and the memory 104 via the host bus 106 is a bus controller 108. The bus controller 108 provides an interface between the host bus 106 and a ROM 110, and an expansion bus 112. A system clock 114 is provided to both the microprocessor 102 and the bus controller 108. Connected to the expansion bus 112 is a monitor 118 via a graphics controller 116, hard disk drives 122 via a disk interface 120, a modem 126 via an RS-232 interface 124, and a printer 130 via a parallel port 128.

In operation, the microprocessor 102 executes instructions, including branch instructions, retrieved from either the memory 104, the ROM 110 or the hard disks 122. The microprocessor can retrieve data from or store data to the memory 104 or the hard disks 122. In addition, the microprocessor 102 can send data to either the modem 126 or the printer 130. The monitor 118 provides a user interface to the microprocessor 102. The computer system 100 is typical of the type of computing system environment into which a processor according to the present invention may be used.

Figure 2:
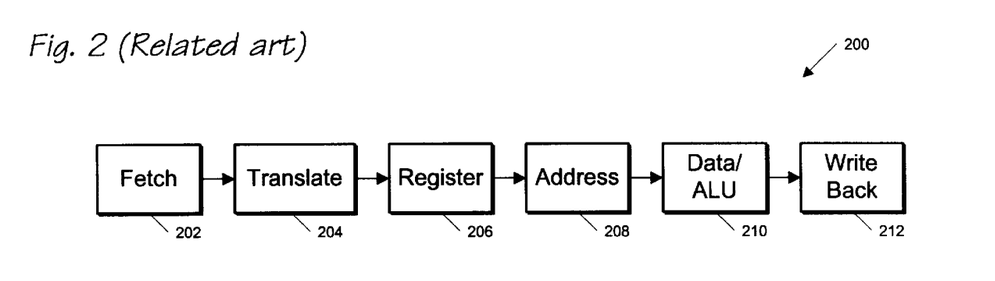
FIG. 2 is a block diagram illustrating processing stages within a related art pipeline microprocessor.

Referring now to FIG. 2, a six-stage pipeline microprocessor 200 is shown. The microprocessor 100 includes Fetch 202, Translate 204, Register 206, Address 208, Data/ALU 210 and Write Back 212 stages. The Fetch stage 202 fetches instructions that are to be executed by the microprocessor 200. The Translate stage 204 translates or decodes the fetched instructions into a sequence of micro operations that may be executed by the microprocessor 200. The Register stage 206 retrieves operands specified by the micro operations from a register file for use by later stages in the pipeline. The Address stage 208 calculates memory addresses specified by micro operations, to be used in data storage and retrieval operations. The Data/ALU stage 210 either performs ALU operations on data retrieved from the register file, or reads/writes data from/to memory using the memory address calculated in the Address stage 208. The Write Back stage 212 writes the result of a data read operation, or an ALU operation, to the register file or to a memory location.

In operation, instructions are fetched by the Fetch stage 202, translated into micro operations by the Translate stage 204, proceeding through stages 206–212 for execution. The pipeline stages of the microprocessor 200 are typical of the type of microprocessor in which the present invention may be used.

Figure 3:
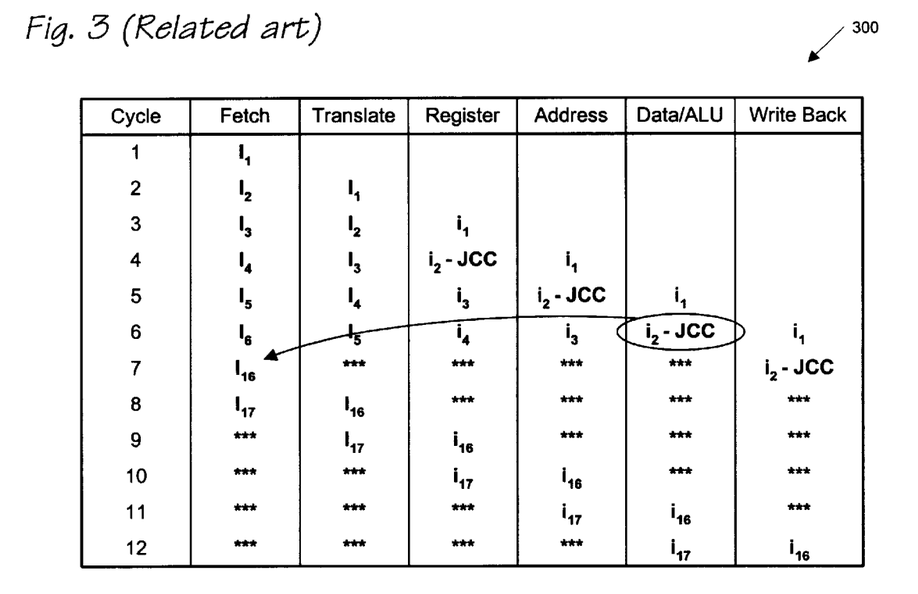
FIG. 3 is a table illustrating pipeline delays after a related art branch instruction is executed.

Now referring to FIG. 3, table 300 illustrates progression of a sequence of instructions through the stages of the pipeline microprocessor of FIG. 2. The instructions are designated as $I_1$, $I_2$, $I_3$, etc., with each instruction being translated into a single micro operation $i_1$, $i_2$, $i_3$, etc. In practice, most instructions are translated into more than one micro operation, but for ease of discussion only one micro operation per instruction is shown. Furthermore, each instruction is shown to proceed through a pipeline stage in a single clock cycle.

Beginning at clock cycle 1, an instruction $I_1$ is fetched by the Fetch stage 202, and is provided to the Translate stage 204.

In clock cycle 2, the instruction $I_1$ is translated by the Translate stage 204 into a micro operation $i_1$, and is provided to the input of the Register stage 206. Also during clock cycle 2, the next instruction $I_2$ is fetched by the Fetch stage 202 and is provided to the Translate stage 204.

In clock cycle 3, the micro operation $i_1$ proceeds through the Register stage 206 and the instruction $I_2$ is translated into a micro operation $i_2$ in the Translate stage 204. During clock cycle 3, the Translate stage 204 detects the instruction $I_2$ is a branch instruction. During clock cycle 4 the Translate stage 204 translates the $I_2$ instruction into a micro operation $i_2$-JCC for provision to the Register stage 206. This micro operation $i_2$-JCC indicates that a conditional jump is specified by instruction $I_2$. During clock cycle 4 the Translate stage 204 also predicts the outcome of the branch. In this example, the branch is predicted to be not taken, therefore the next sequential instruction $I_3$ is fetched. As will be seen, the prediction turns out to be incorrect.

Instructions are continuously fetched by the Fetch stage 202, translated by the Translate stage 204, and executed by the stages 206–212. This process continues until the branch instruction executes where its outcome is determined. Because the branch is taken in this example, the Fetch stage 202 is instructed to fetch an instruction that is not sequential. This is particularly illustrated in clock cycle 6.

During clock cycle 5, the target address for the conditional jump operation is calculated in the Address stage 208. During clock cycle 6, the condition specified by the conditional jump operation $i_2$-JCC is tested. If the test fails, indicating that the jump should not be taken, the operation $i_2$-JCC proceeds through stages 210–212 and completes. If this were the case, the proceeding pipeline stages would already be filled with sequential instructions, and no processing delay would occur.

However, as shown in table 300, the condition passes the test, indicating that the jump should be taken. Therefore, the target address calculated by the Address stage 208, during clock cycle 5, is provided to the Fetch stage 202 at the end of clock cycle 6. Thus, during clock cycle 7 the Fetch stage 202 uses the target address to retrieve instruction $I_{16}$, and to provide this instruction to the Translate stage 204. The instruction $I_{16}$ represents the instruction specified by the conditional branch operation $i_2$-JCC. That is, instruction $I_{16}$ resides at the target address of the conditional jump instruction.

In addition, all of the intermediate instructions, $I_3$–$I_6$ are flushed from the pipeline. And, the Fetch stage 202 begins sequential instruction fetching from $I_{16}$. This process is repeated until the next program control instruction is encountered.

Examination of the Write Back column of the table 300 indicates that 5 clock cycles were required to transition control from instruction $I_2$ to instruction $I_{16}$. One clock cycle was required for the branch instruction, and 4 holes were created, relating to the delay between resolving the branch instruction in the Data/ALU stage 210, and fetching new instructions in the Fetch stage 202. It may be observed that valuable processing cycles are wasted by the creation of the holes shown in FIG. 3. These holes are commonly referred to as the mispredict penalty. Mispredict penalties adversely affect the overall performance of a microprocessor, particularly pipelined and/or superscalar microprocessors. Thus, the need for accurate branch prediction mechanisms is apparent.

Figure 4:
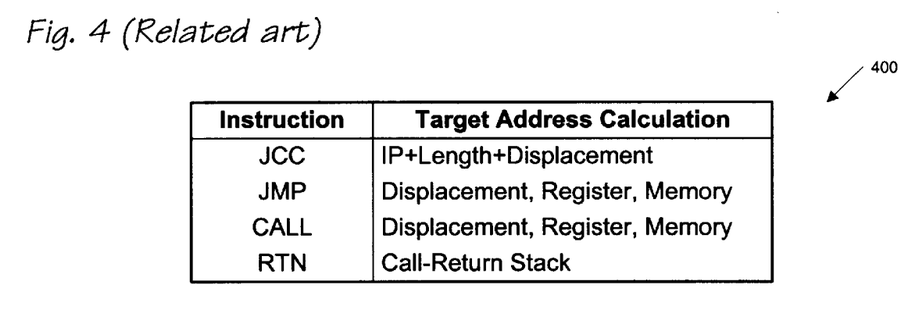
FIG. 4 is a table illustrating target address calculations for different program control instructions.

Referring now to FIG. 4, a table 400 is shown that illustrates four program control instructions. Three of the instructions are unconditional branches, i.e., JMP, CALL and RTN. The fourth program control instruction, listed first in table 400, JCC indicates one of a number of different conditional branch instructions. Also shown in table 400 are the types of target address calculations available for the different instructions. In general the JCC branch instruction is used for near jumps to locations within the current code segment. The displacement value is relative to the next instruction's first byte and can be –128 to +127 bytes (for an 8-bit displacement), –32768 to +32767 (for a 16-bit displacement) or $-2^{31}$ to $+2^{31}-1$ (for a 32 bit displacement).

The JMP and CALL branch instructions can also calculate the target address by specifying a displacement value. In addition, they can utilize an operand reference to either a register or a memory location. The RTN branch instruction utilizes a call-return stack to retrieve the target address.

In practice, a significant majority of the target addresses for JCC, JMP and CALL instructions utilize a displacement value to refer to the target address. Since the displacement is provided to a microprocessor along with a branch instruction an embodiment of the present invention performs branch prediction by examining the test type of the conditional branch along with the displacement value.

Figure 5:
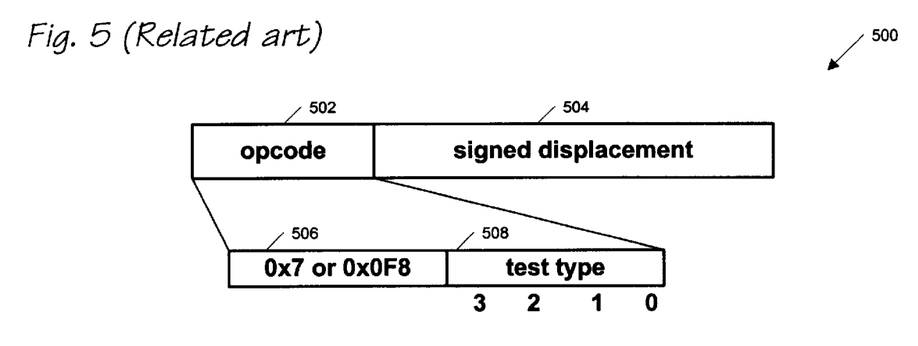
FIG. 5 is a table illustrating a typical branch instruction format including opcode and displacement fields.

Referring now to FIG. 5, the format of an x86 conditional jump instruction is shown. The x86 conditional jump instruction is referred to as Jcc on page 25–190 of the in the Intel Pentium Processor Family Developer's Manual Volume 3: Architecture and Programming Manual, 1995, which is hereby incorporated by reference in its entirety. The conditional jump instruction specifies the test type of the branch condition in an opcode field 502. The opcode field 502 comprises a value 506 which identifies the instruction as a conditional jump instruction and four bits which identify the test type 508 of the instruction, thereby enabling sixteen different test types to be specified in a Jcc instruction. These test types are specified on page 25–190 of the above-referenced Pentium manual. The Jcc instruction also specifies a displacement field 504 for calculating a branch target address. The value 506 that identifies the instruction as a conditional jump instruction is 0x7 for a Jcc with 8-bit displacement and 0x0F8 for a Jcc with 16-bit or 32-bit displacement as specified on page 25–190 of the above-referenced Pentium manual.

Figure 6:
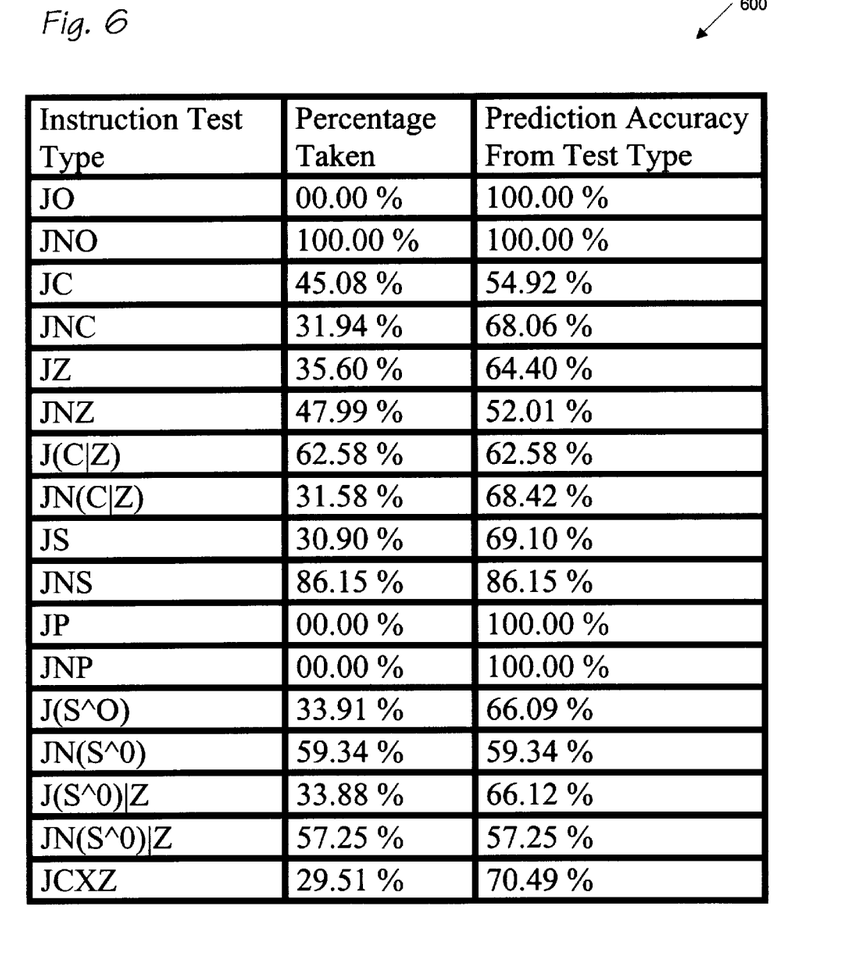
FIG. 6 is the table showing percentages of taken branches for various conditional jump instruction test types collected in relation to the present invention.

Referring now to FIG. 6, the table 600 shows percentages of taken branches for various test types of x86 conditional jump instructions. The table comprises empirical data collected by the present inventors from execution on an x86 processor of popular application programs such as Microsoft® Excel, Word, PowerPoint, and Access as well as Lotus® 1-2-3, WordPerfect®, and Netscape®. The present inventors have advantageously observed that for some test types the branch outcomes of x86 conditional jump instructions are highly predictable based solely on the test type as shown in table 600.

Although one embodiment of the invention is described with respect to an x86 macro-instruction processor, it will be clear to one skilled in the art that the present invention may be applied to other microprocessor architectures and other test type subsets. Therefore, the present disclosure is not intended to be limited to application within the x86 architecture. Furthermore, although embodiments are described which predefine subsets of test types for which branches are statically predicted to be taken or not taken, the present disclosure is not limited to the particular subsets described. Rather, the present invention is directed broadly to the static prediction of branch outcome based on the test type of the branch instruction. Furthermore, the present invention is directed to the static prediction of branch outcome based on the combination of test type and target address displacement sign.

The test types for which data was collected correspond to the x86 architecture test types and are designated in table 600 according to commonly recognized x86 instruction mnemonics. The test types are overflow (JO), not overflow (JNO), carry (JC), not carry (JNC), zero (JZ), not zero (JNZ), carry or zero (J(C|Z)), not carry or zero (JN(C|Z)), sign (JS), not sign (JNS), parity (JP), not parity (JNP), sign and overflow not equal (J(S^O)), sign and overflow equal (JN(S^O)), sign and overflow not equal or zero (J(S^O)|Z), sign and overflow equal or zero (JN(S^O)|Z), and CX register zero (JCXZ). The test types correspond to status flag bits in the EFLAGS register of x86 architecture processors. It is noted that a given processor may support other test types and one skilled in the art will recognize the present invention is not limited to a particular set of test types supported by a microprocessor employing the present invention.

For each test type, the percentage of branches taken for each test type is shown in the middle column. Also shown in the far right column is the percentage of correct predictions that may be made solely by examining the test type. This value is simply the maximum of the middle column and the difference between 100% and middle column. It is noted that the sample size for some test types, such as the parity (JP) and not parity (JNP) test types, may be statistically insufficient to draw an inference regarding the predictability of these test types.

As may be observed, for a first subset of the test types a high percentage of the branches are taken, such as not overflow (JNO) and not sign (JNS). In addition, for a second subset of the test types a high percentage of the branches are not taken, such as overflow (JO). This observation is advantageous in performing static branch prediction and improving the overall performance of microprocessors as described in this invention and related inventions described in related U.S. patent applications entitled "Method and Apparatus for Performing Branch Prediction of Conditional Branch Instructions" (IDT1389), "Method and Apparatus Employing Split History Tables for Performing Branch Prediction" (IDT1390), and "Method and Apparatus Performing Branch Prediction Combining Static and Dynamic Branch Predictors" (IDT1393), assigned to a common assignee, concurrently filed with the present application and incorporated by reference herein.

Figure 7:
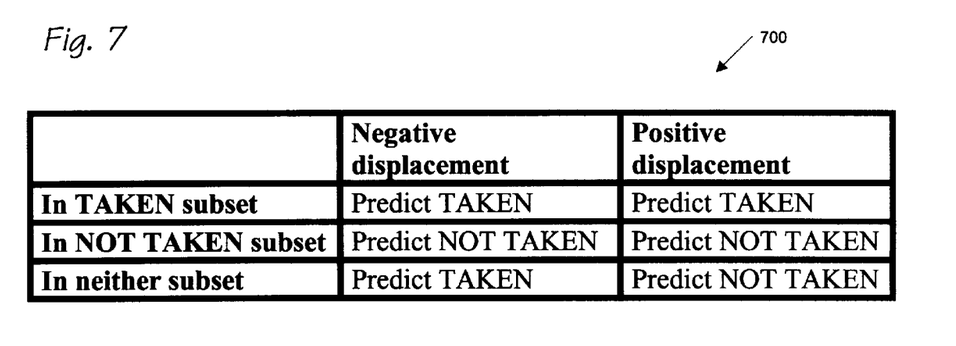
FIG. 7 is a truth table illustrating a branch prediction method of the present invention.

Referring now to FIG. 7, a truth table 700 is shown illustrating a branch prediction method of the present invention. The actions shown, "predict TAKEN" and "predict NOT TAKEN", are in response to two inputs: the sign of the displacement of a conditional branch instruction and the test type of the branch instruction. From the test type of the branch instruction a determination is made of whether the test type falls within one of two subsets of test types which a microprocessor's instruction set supports: a TAKEN subset and a NOT TAKEN subset.

As may be observed from the table 700, if the test type falls within the TAKEN subset, then the branch instruction is predicted taken. Conversely, if the test type falls within the NOT TAKEN subset, then the branch instruction is predicted not taken. Finally, if the test type does not fall within either subset then the sign of the branch target address displacement is used to make the prediction. If the sign is negative then the branch is predicted taken. If the sign is positive then the branch is predicted not taken.

In one embodiment, based on table 600 of FIG. 6, the TAKEN subset comprises not overflow (JNO) and not sign (JNS) and the NOT TAKEN subset comprises overflow (JO). These subsets are chosen on the recognition that the accuracy of the branch prediction based upon the test type alone may be superior to the accuracy based solely on the direction of the target address if the branch is taken. However, as previously stated, the present invention is not limited to the specific embodiments discussed. Advantageously, the method of the present invention performs branch prediction statically by examining the test type and displacement sign, without employing dynamic branch history information.

Figure 8:
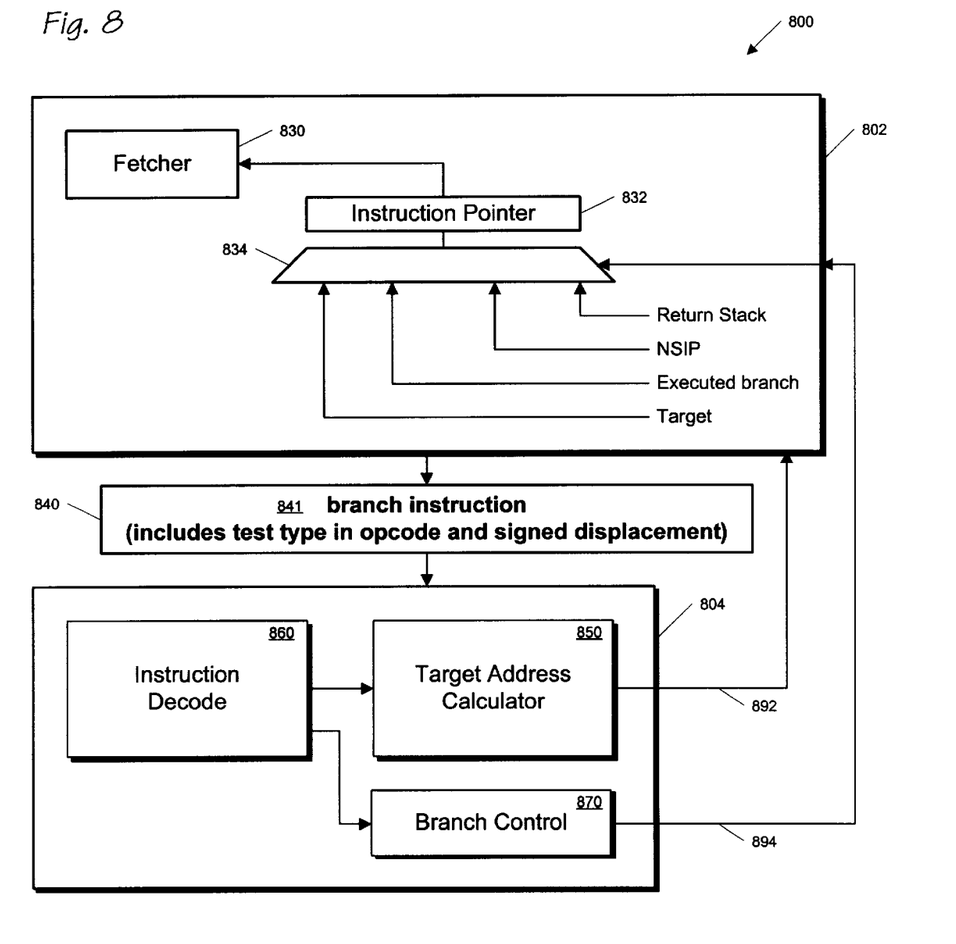
FIG. 8 is a block diagram of portions of a pipeline microprocessor according to the present invention and in particular of fetch and translate stages comprising a static branch predictor according to the present invention of FIG. 10.

Referring now to FIG. 8, a microprocessor 800 is shown that includes a Fetch stage 802 and a Translate stage 804. As above, the Fetch stage 802 fetches instructions to be executed by the microprocessor 800. The Fetch stage 802 provides the instructions to the Translate stage 804 to be decoded into sequences of micro operations for execution by later stages (not shown) in the microprocessor 800 such as stages 206–212 in microprocessor 200 of FIG. 2.

Within the Fetch stage 802 is a fetcher 830 connected to an instruction pointer 832, which is connected to a mux 834. The instruction pointer 832 provides an address of the next instruction to be fetched to the fetcher 830. The contents of the instruction pointer 832 are determined by the mux 834. The mux 834 has four inputs. A first input, NSIP, provides the next sequential address to be retrieved if program flow proceeds sequentially. A second input, Executed Branch, provides a target address from a branch instruction that has been resolved (i.e., that has passed through the Address and Data/ALU stages (not shown) of the microprocessor 800). A third input, Return Stack, provides an address retrieved from the call-return stack when a RTN instruction is executed. A fourth input, Target, is a target address calculated within the Translate stage 804 as will be further discussed below.

Within the Translate stage 804 is an Instruction Decode 860 connected to a Target Address Calculator 850, and a Branch Control 870. The Translate stage 804 is connected to the Fetch stage 802 via an instruction register 840. The instruction register 840 contains an instruction 841, such as a Jcc instruction, which includes an opcode field (including the test type of the branch instruction) and a displacement field. Execution of a branch instruction containing a displacement from the present branch instruction address will now be discussed.

When the Fetch stage 802 provides a conditional jump instruction to translate stage 804, the instruction decode 860 provides its displacement to the target address calculator 850. While not shown, the target address calculator 850 is also connected to the instruction pointer 832. The target address calculator 850 adds the contents of the instruction pointer 832 to the displacement and provides the resulting target address to the Fetch stage 802 via bus 892. In one embodiment, the instruction decode 860 also provides the length of the jump instruction to the target address calculator 850, so that the target address is displaced from the address following the jump instruction.

The target address that is provided to the Fetch stage 802 may then be used to fetch the next instruction if the static branch predictor of the present invention (described in detail in FIGS. 10 and 11) predicts the jump instruction will branch to the target address. This is determined by the Branch control 870, as follows.

Although the embodiment of FIG. 8 describes the target address calculator 850 located within the translate stage 804, the target address calculator 850 may be located within other stages of the microprocessor 800 within departing from the novelty of the present invention. For example, the target address may be calculated in an address stage (not shown), such as Address stage 208 of FIG. 2. Providing the target address calculator 850 in the translate stage 804 reduces the impact of branch misprediction relative to the scenario described in FIG. 3 regardless of the branch prediction method.

When a jump instruction is translated by the instruction decode 860, the instruction decode 860 notifies the branch control 870 that a jump instruction has been detected. The branch control 870 then provides an output control signal via line 894 to the Fetch stage 802 to either select the target address, or the NSIP, to be output from the mux 834 to the instruction pointer 832. Preferably, a static branch predictor according to the present invention is comprised within the branch control 870 for predicting whether the jump will be taken, as discussed in the description of FIGS. 10 and 11. However, one skilled in the art will appreciate that the static branch predictor of the present invention may be located in other portions or stages of the microprocessor 800 without departing from the novelty of the present invention.

One skilled in the art will appreciate that the displacement provided by the displacement field of the branch instruction 841 may be provided as an 8-bit displacement, a 16-bit displacement, or possibly a 32-bit displacement. In one embodiment of the present invention, the instruction decode 860 determines the displacement size during decode, and provides the size of the displacement to the target address calculator 850 in sufficient time to allow the target address calculator 850 to calculate an accurate target address.

Figure 9:
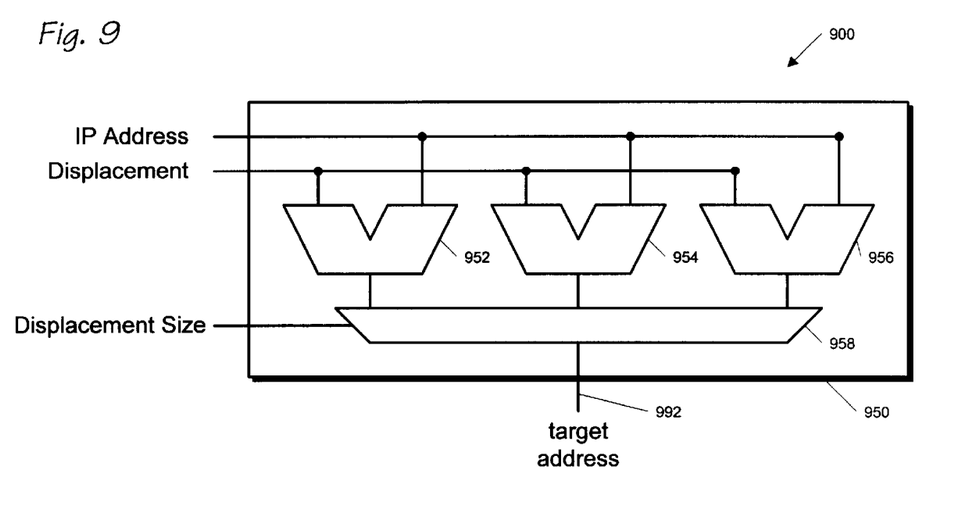
FIG. 9 is a block diagram of a displacement adder for calculating a target address for a branch instruction.

An alternative embodiment of a target address calculator 900 is provided in FIG. 9, to which attention is now directed. The target address calculator 900 contains three adders 952, 954 and 956, each designed to add one of the displacement size types. Each have their inputs the IP address and the displacement. The outputs of the three adders 952–956 are provided to a mux 958. The output of the mux 958 is selected by using a displacement size signal provided by the instruction decode. The output of the mux 958 is the target address 992. It should be appreciated that other displacement bit-sizes, or other types of calculators could be used in the translate stage 804 to add the displacement to the instruction pointer without departing from the novelty of the present invention.

Figure 10:
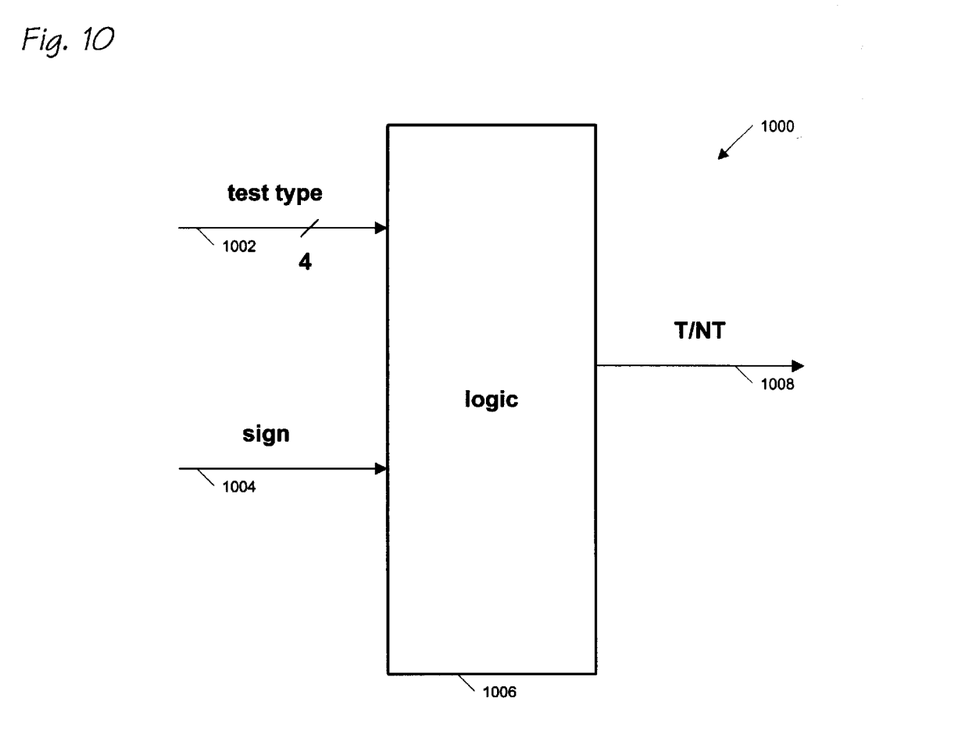
FIG. 10 is block diagram of a static branch predictor according to the present invention.

Referring now to FIG. 10, a static branch predictor 1000 according to an embodiment of the present invention is shown. The embodiment of FIG. 10 is configured for performing static branch prediction of x86 Jcc macroinstructions. The static branch predictor 1000 comprises two inputs and an output. The first input 1002 is the four bits of the test type 508 of a Jcc instruction as illustrated in FIG. 5. The second input 1004 is the sign of the displacement 504 of a Jcc instruction as illustrated in FIG. 5. Preferably, the static branch predictor 1000 is configured to receive the two inputs from the instruction register 840 of FIG. 8.

The two inputs 1002 and 1004 are received by logic 1006. Preferably, the logic 1006 comprises combinatorial logic in conformance with the truth table 700 of FIG. 7 and the flowchart 1100 of FIG. 11 to generate a T/NT (Taken/Not Taken) branch prediction signal 1008. In one embodiment, the static branch predictor is comprised within the branch control 870 of FIG. 8. Preferably, the T/NT signal 1008 is used by the branch control 870 to generate signal 894 for selecting a value to be loaded into the instruction pointer 832. Thus, the T/NT signal 1008 operates to determine, in part, the location of the next instruction to be fetched into the instruction register 840 for translation by the translation stage 804 as discussed in the description of FIG. 8.

It is noted that an embodiment of the static branch predictor of FIG. 10 may be employed that does not include the displacement sign. The embodiment receives only the test type 1002 and makes the prediction 1008 based solely upon the test type 1002. In such an embodiment, the flowchart of FIG. 11, which will not be discussed, would accordingly not require steps 1112–1116.

Figure 11:
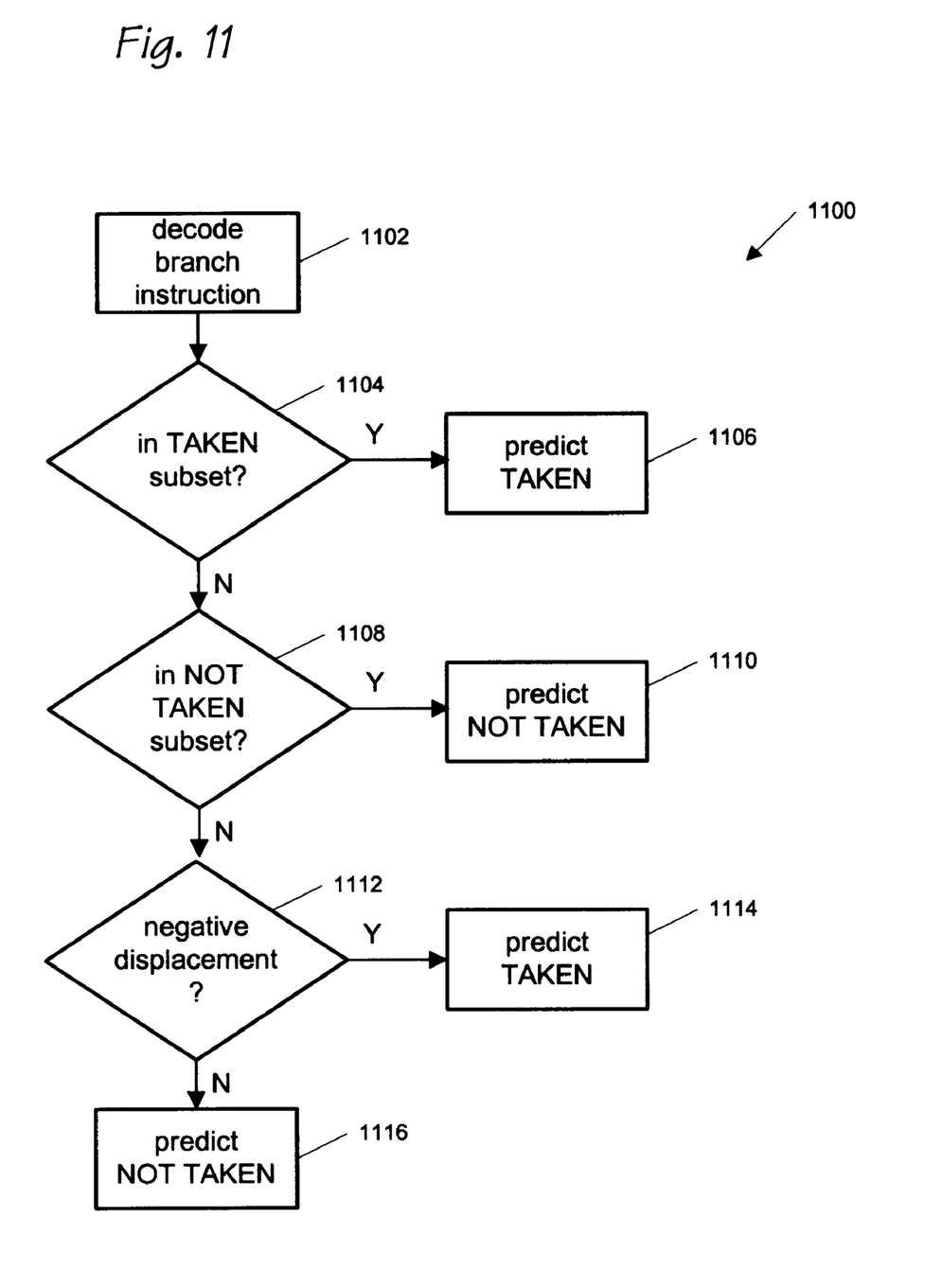
FIG. 11 is a flow chart illustrating execution of the static branch predictor of FIG. 10.

Referring now to FIG. 11, a flowchart 1100 illustrating operation of the static branch predictor 1000 of FIG. 10 is shown. In step 1102, the predictor 1000 decodes the branch instruction, in particular the test type of the branch instruction, provided to it from the instruction register 840 of FIG. 8.

In step 1104, the predictor 1000 determines if the test type is in the TAKEN subset of test types. For example, if the TAKEN subset comprises the not overflow and not sign test types, then the predictor 1000 determines if the test type match the hexadecimal values 0x1 or 0x9, respectively. The values 0x1 and 0x9 correspond to the lower nibble of the JNO and JNS conditional jump instructions as specified in the Pentium Programmer's manual. If the test type is in the TAKEN subset, the predictor 1000 generates a value on the T/NT signal 1008 of FIG. 10 indicating a prediction that the jump will be taken, in step 1106.

In step 1108, the predictor 1000 determines if the test type is in the NOT TAKEN subset of test types. For example, if the NOT TAKEN subset comprises the overflow test type, then the predictor 1000 determines if the four bits of the test type match the hexadecimal value 0x0. The value 0x0 corresponds to the lower nibble of the JO conditional jump instruction as specified in the Pentium Programmer's manual. If the test type is in the NOT TAKEN subset, the predictor 1000 generates a value on the T/NT signal 1008 indicating a prediction that the jump will not be taken, in step 1110.

If the test type is not in the TAKEN or NOT TAKEN subsets, then the predictor 1000 makes a prediction based upon the displacement of the jump instruction. In step 1112, the predictor 1000 determines if the sign of the displacement is negative. If the sign is negative, then the predictor 1000 generates a value on the T/NT signal 1008 indicating a prediction that the jump will be taken, in step 1114. If the sign is positive, then the predictor 1000 generates a value on the T/NT signal 1008 indicating a prediction that the jump will not be taken, in step 1116.

Although the present invention and its objects, features, and advantages have been described in detail, other embodiments are encompassed by the invention. For example, variations of the location of the static branch predictor may exist. An embodiment is contemplated wherein the static branch predictor is comprised within the fetch stage of the microprocessor. As long as the displacement and test type can be extracted from a fetched instruction, the prediction of the branch outcome can be made. Variations on pipeline architecture exist, which combine some stages described in the present invention into a single stage, or separate one of the described stages into two or more stages. In addition, some microprocessors reorder the stages described as needed. The number or order of pipeline stages is not significant to the operation of the present invention. Rather, it is the static branch prediction accuracy improvement obtained by the combination of examining the test type of the branch instruction that is of interest. Moreover, various combinations of test types may be employed to comprise the TAKEN and NOT TAKEN subsets without departing from the spirit and scope of the present invention. Additionally, it is the further static branch prediction accuracy improvement obtained by additionally examining the displacement sign if the test type is not determinative that is of interest.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A static branch predictor for performing branch prediction in a microprocessor having an instruction set, comprising:
    an input for receiving a test type specifying a condition upon which a branch instruction will be taken;
    an output for generating a signal for predicting whether said branch instruction will be taken in response to said test type received by said input; and
    logic coupled to said input and output, wherein said logic is configured to determine if said test type is in a predefined subset of a plurality of test types, wherein said plurality of test types is defined in the microprocessor's instruction set, wherein said logic is configured to convey to said output a value predicting that said branch instruction will not be taken if said test type is in said predefined subset.

2. The static branch predictor of claim 1, wherein said predefined subset of said plurality of test types comprises at least one of the following test types and combinations thereof: overflow, zero, carry, parity and sign.

3. The static branch predictor of claim 1, wherein said logic is further configured to determine if said test type is in a second predefined subset of said plurality of test types defined in the microprocessor's instruction set, wherein said logic is configured to convey to said output a value predicting that said branch instruction will be taken if said test type is in said second predefined subset.

4. The static branch predictor of claim 3, wherein said second predefined subset of said plurality of test types comprises at least one of the following test types and combinations thereof: overflow, zero, carry, parity and sign.

5. The static branch predictor of claim 3, further comprising a second input for receiving a sign of a displacement for calculating a target address of said branch instruction, wherein said logic is further configured to convey to said output a value predicting said branch instruction will be taken if said sign of said displacement is negative and if said test type is not in either of said first and second predefined subsets.

6. A static branch predictor for performing branch prediction in a microprocessor having an instruction set, comprising:
    a first input for receiving a sign of a displacement for calculating a target address of a branch instruction;
    a second input for receiving a test type for specifying a condition upon which said branch instruction will be taken;
    an output for transmitting a signal for indicating a prediction of whether said branch instruction will be taken in response to said sign and said test type; and
    logic configured to receive said first and second inputs and to generate said signal on said output, wherein said logic is configured to determine if said test type is in either one of first and second predefined subsets of a plurality of test types defined in the microprocessor's instruction set;
    wherein said logic is configured to generate said signal on said output to indicate said branch instruction will be taken if said test type is in said first predefined subset;
    wherein said logic is configured to generate said signal on said output to indicate said branch instruction will not be taken if said test type is in said second predefined subset; and
    wherein said logic is configured to generate said signal on said output to indicate whether said branch instruction will be taken based on said displacement if said test type is not in either of said first and second predefined subsets.

7. The static branch predictor of claim 6, wherein said logic is configured to generate said signal on said output to indicate whether said branch instruction will be taken based on a sign of said displacement.

8. The static branch predictor of claim 7, wherein said logic is configured to generate said signal on said output to indicate said branch instruction will be taken if said sign is negative and will not be taken if said sign is positive.

9. The static branch predictor of claim 6, wherein said first and second predefined subsets of said plurality of test types have no elements in common and each comprise at least one of the following test types and combinations thereof: overflow, zero, carry, parity and sign.

10. A method for performing branch prediction in a microprocessor having an instruction set, comprising:
    decoding a conditional branch instruction comprising a displacement for calculating a target address of said branch instruction and a test type for specifying a condition upon which said branch instruction will be taken;
    determining if said test type is in either one of first and second predefined subsets of a plurality of test types defined in the microprocessor's instruction set;
    predicting said branch instruction will be taken if said test type is in said first predefined subset;
    predicting said branch instruction will not be taken if said test type is in said second predefined subset; and
    predicting whether said branch instruction will be taken based on said displacement if said test type is not in either of said first and second predefined subsets.

11. The method of claim 10, wherein said predicting whether said branch instruction will be taken based on said displacement comprises predicting whether said branch instruction will be taken based on a sign of said displacement.

12. The method of claim 11, wherein said predicting whether said branch instruction will be taken based on said sign of said displacement comprises predicting said branch instruction will be taken if said sign is negative and predicting said branch instruction will not be taken if said sign is positive.

13. The method of claim 10, wherein said microprocessor comprises an x86 architecture microprocessor.

14. The method of claim 10, wherein said first and second predefined subsets of said plurality of test types have no elements in common and each comprise at least one of the following test types and combinations thereof: overflow, zero, carry, parity and sign.

15. The method of claim 10, wherein said microprocessor comprises a pipelined microprocessor.

16. A microprocessor capable of performing branch prediction, comprising:
    instruction fetch logic, configured to fetch a conditional branch instruction comprising a displacement for calculating a target address of said branch instruction and a test type for specifying a condition upon which said branch instruction will be taken; and
    a static branch predictor coupled to said instruction fetch logic, configured to receive said conditional branch instruction from said instruction fetch logic and to generate an output signal for provision to said instruction fetch logic for predicting whether said branch instruction will be taken in response to said conditional branch instruction, wherein said static branch predictor comprises prediction logic for determining if said test type is in either one of first and second predefined subsets of a plurality of test types defined in the microprocessor's instruction set;

wherein said prediction logic is configured to generate said output signal to indicate said branch instruction will be taken if said test type is in said first predefined subset;

wherein said prediction logic is configured to generate said output signal to indicate said branch instruction will not be taken if said test type is in said second predefined subset;

wherein said prediction logic is configured to generate said output signal to indicate whether said branch instruction will be taken based on said displacement if said test type is not in either of said first and second predefined subsets; and wherein said instruction fetch logic is configured to selectively fetch a next instruction in response to said output signal.

17. The microprocessor of claim 16, further comprising an address calculation unit configured to calculate a target address of said branch instruction by adding at least an address of said branch instruction and said displacement, wherein said instruction fetch logic is configured to fetch a next instruction from said target address if said output signal indicates said branch instruction will be taken.

18. The microprocessor of claim 16, wherein said address calculation unit is configured to calculate a next sequential instruction address by adding at least said address of said branch instruction and a size of said branch instruction, wherein said instruction fetch logic is configured to fetch a next instruction from said next sequential instruction address if said output signal indicates said branch instruction will not be taken.

19. The microprocessor of claim 16, wherein said logic is configured to generate a value on said output signal to predict whether said branch instruction will be taken based on a sign of said displacement.

20. The microprocessor of claim 19, wherein said logic is configured to generate a value on said signal to predict said branch instruction will be taken if said sign is negative and will not be taken if said sign is positive.

21. The microprocessor of claim 16, wherein said first and second predefined subsets of said plurality of test types have no elements in common and each comprise at least one of the following test types and combinations thereof: overflow, zero, carry, parity and sign.

22. The microprocessor of claim 16, wherein said microprocessor is an x86 architecture microprocessor.

23. The microprocessor of claim 16, wherein said microprocessor is a pipelined microprocessor.

* * * * *